(12) United States Patent
Goldberg

(10) Patent No.: US 7,551,680 B2
(45) Date of Patent: Jun. 23, 2009

(54) WIRELESS COMMUNICATION METHOD AND APPARATUS FOR FORMING, STEERING AND SELECTIVELY RECEIVING A SUFFICIENT NUMBER OF USABLE BEAM PATHS IN BOTH AZIMUTH AND ELEVATION

(75) Inventor: Steven Jeffrey Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 359 days.

(21) Appl. No.: 11/014,290

(22) Filed: Dec. 16, 2004

(65) Prior Publication Data

US 2006/0093055 A1 May 4, 2006

Related U.S. Application Data

(60) Provisional application No. 60/622,899, filed on Oct. 28, 2004.

(51) Int. Cl.
H04B 7/02 (2006.01)
(52) U.S. Cl. ......................................... 375/267; 342/81
(58) Field of Classification Search ................. 375/267, 375/260, 259, 295, 316, 377, 616; 342/5, 342/6, 21, 59, 81, 73, 74, 350
See application file for complete search history.

(56) References Cited

U.S. PATENT DOCUMENTS

| | | | | |
|---|---|---|---|---|
| 4,121,212 A | * | 10/1978 | Taylor, Jr. | 342/201 |
| 4,721,960 A | * | 1/1988 | Lait | 342/368 |
| 4,947,176 A | * | 8/1990 | Inatsune et al. | 342/173 |
| 5,276,452 A | * | 1/1994 | Schuss et al. | 342/371 |
| 5,510,796 A | * | 4/1996 | Applebaum | 342/162 |
| 5,987,037 A | * | 11/1999 | Gans | 370/480 |
| 6,014,372 A | | 1/2000 | Kent et al. | |
| 6,038,459 A | * | 3/2000 | Searle et al. | 455/562.1 |
| 6,130,638 A | * | 10/2000 | Winter et al. | 342/147 |
| 6,665,545 B1 | * | 12/2003 | Raleigh et al. | 455/562.1 |
| 6,690,917 B2 | | 2/2004 | Soliman et al. | |

(Continued)

OTHER PUBLICATIONS

Chiang et al., "A Foam Dialectric Matrix-Fed Electronically Despun Circular Array," *Antennas and Propagation Society International Symposium*, vol. 8, pp. 29-36, (Sep. 1970).

(Continued)

*Primary Examiner*—Temesghen Ghebretinsae
(74) *Attorney, Agent, or Firm*—Volpe and Koenig, P.C.

(57) ABSTRACT

A wireless communication method of exploiting the radio frequency (RF) physical environment to establish a sufficient number of usable multiple paths of RF propagation for facilitating communications. The method is implemented in a wireless communication system including at least one transmitter and at least one receiver. The receiver's antenna is directed towards one of a plurality of reception paths and receives a data stream from the transmitter via the reception path that the receiver antenna is directed towards. The receiver decodes the data stream, reconstructs a modulation pattern of the decoded data stream, and subtracts the reconstructed data stream from a sum of all of the signals received by the receiver via the reception paths. The receiver provides received signal direction information associated with reception paths to the transmitter. The transmitter adjusts and/or eliminates one or more of the reception paths that are unusable based on the signal direction information.

12 Claims, 7 Drawing Sheets

U.S. PATENT DOCUMENTS

| | | |
|---|---|---|
| 6,816,106 B1 | 11/2004 | Butler |
| 6,816,120 B2 | 11/2004 | Kuramoto |
| 6,992,622 B1 | 1/2006 | Chiang et al. |
| 7,193,574 B2 | 3/2007 | Chiang et al. |
| 7,236,808 B2 | 6/2007 | Goldberg |
| 7,245,939 B2 | 7/2007 | Goldberg |
| 2002/0159431 A1 | 10/2002 | Moulsley et al. |
| 2003/0203743 A1 | 10/2003 | Fulton et al. |

OTHER PUBLICATIONS

Kulatunga et al., "Robust Multiuser Detection In Flat Fading Non-Gaussian Channels," *The VI IEEE International Workshop on Signal Processing Advances in Wireless Communications*, IEEE SPAWC 2005, (Jun. 2005).

Korhonen, *Introduction to 3G Mobile Communications, Second Edition* Artech House mobile communications series, pp. 28-29, 47-48, (2003).

\* cited by examiner

WIRELESS COMMUNICATION METHOD AND APPARATUS FOR FORMING, STEERING AND SELECTIVELY RECEIVING A SUFFICIENT NUMBER OF USABLE BEAM PATHS IN BOTH AZIMUTH AND ELEVATION

CROSS REFERENCE TO RELATED APPLICATION

This application claims priority from U.S. provisional application No. 60/622,899, filed Oct. 28, 2004, which is incorporated by reference as if fully set forth.

FIELD OF THE INVENTION

The present invention relates to a wireless communication system including a transmitter and a receiver. More particularly, the present invention relates to forming, steering and selectively receiving usable beam paths.

BACKGROUND

A multipath in radio frequency (RF) communications refers to the existence of multiple paths of RF propagation between a transmitter and a receiver. In situations when the paths contain the same data, but are spaced apart in time, the resultant reception can be destructive. There are however circumstances when it is actually desirable to have multiple paths. In these cases each path can carry a different data stream. This technique is referred to as a layered space approach, or under the broader category of multiple input and multiple output (MIMO) communication systems. If the transmitter and receiver are capable of utilizing each path, the effective data bandwidth of the link between the two can be increased by the number of unique usable paths.

One problem is that not enough natural paths, or existing paths with discernable characteristics, may be exploitable for the capabilities of the transmitters and receivers to be fully utilized. The prior art exploits the elevation variable characteristics of a transmitter. This path may not always be available due to the lack of intervening physical obstacles to scatter the signals. Even when this option is available, it may not provide sufficient paths to fully utilize the ability of the transmitter and receiver.

FIG. 3 illustrates a prior art wireless communication system 300 which includes a transmitter 305 and a receiver 310. The transmitter 305 forms a multipath, (i.e., a first path 315 and an additional path 320), via an elevation antenna pattern. However, the additional path 320 formed by the transmitter 305 is formed by directing a beam towards the ground 325.

Conventional wireless communication systems use beam forming for non-MIMO purpose. Therefore, a method and apparatus is desired for exploiting the RF physical environment by combining beam forming with MIMO to provide a sufficient number of paths.

SUMMARY

The present invention is related to a wireless communication method of exploiting the RF physical environment to establish a sufficient number of usable multiple paths of RF propagation for facilitating communications. The method is implemented in a wireless communication system including at least one transmitter and at least one receiver. The receiver's antenna is directed towards one of a plurality of reception paths and receives a data stream from the transmitter via the reception path that the receiver antenna is directed towards. The receiver decodes the data stream, reconstructs a modulation pattern of the decoded data stream, and subtracts the reconstructed data stream from a sum of all of the signals received by the receiver via the reception paths. The receiver provides received signal direction information associated with reception paths to the transmitter, (i.e., the receiver is configured to determine the direction the incident signals are coming from). The transmitter adjusts and/or eliminates one or more of the reception paths that are unusable based on the received signal direction information, (i.e., the transmitter is configured to direct beam nulls toward the signals to be attenuated).

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENT(S)

Figure 1:
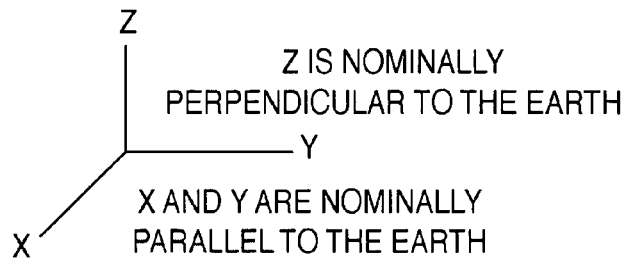
FIG. 1 illustrates a conventional coordinate system which depicts a nominal orientation.

The preferred embodiments will be described with reference to the drawing figures where like numerals represent like elements throughout.

FIG. 1 illustrates the coordinate system utilized in a nominal orientation. The present invention will operate with adjustments being made for deviations from the orientations that are described using the coordinate system of FIG. 1. For example, obstacles, (e.g. buildings), may not always present a displacement only in the Z direction. Slanted, curved, or irregular structures exist, somewhat randomizes their orientation with respect to the present invention's components, resulting in a spread of reflections and refractions. The general direction of signals however is preserved sufficiently to affect the needs of the present invention.

Figure 2:
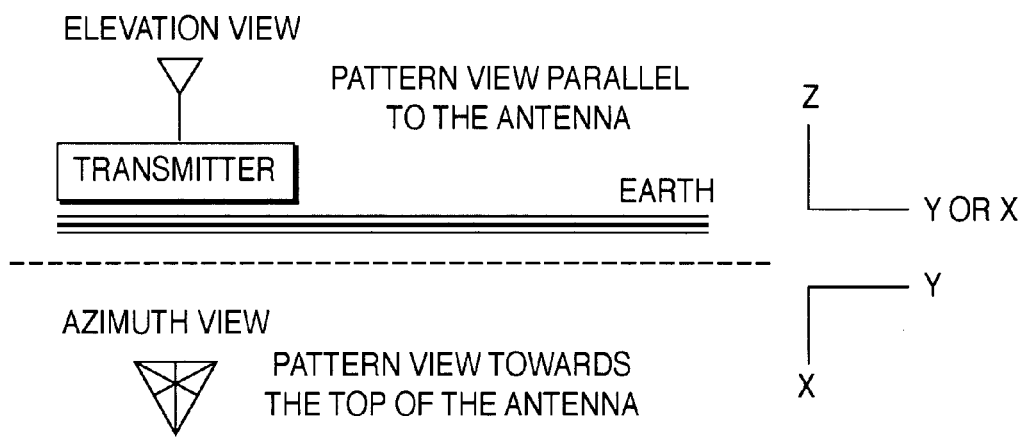
FIG. 2 facilitates the visualization and interpretation of the three dimensional situations shown in FIGS. 3, 4 and 9-14.

It can be somewhat difficult to visualize the three dimensional situations to be depicted. To facilitate this need, two views of each situation as illustrated in FIGS. 3-10 are presented, as depicted in FIG. 2. The Elevation view represents a view from the surface of the earth looking at the antennas. The Azimuth view will represent a view from above the antennas looking down towards the Earth. As shown in FIG. 2, one dimension will therefore always be "compressed into the page." Additionally, the pattern outlines of the beams are approximations to the actual outline of the beams, and represent power levels relative to the peak at the boresight. Lower degree lobes are not shown for clarity. Likewise, during reflections, refractions, and propagations through some obstacles, the patterns may become very irregular and numerous.

In conventional wireless communication systems, the transmission and receive antenna patterns are at most set up to provide maximum power transmission and reception between the transmitter and receiver. In its simplest form, the present invention uses multiple antenna beam forming elements at the transmitter and receiver. Reflectors may be placed behind the elements to direct the overall antenna pattern in a general direction. The antennas used by the present invention have the ability to beam form either or both the transmitter and receiver arrays. The present invention exploits the availability of beam steering in both the azimuth and elevation aspects. It further exploits the availability of beam forming at both the transmitter and receiver when available.

Figure 4:
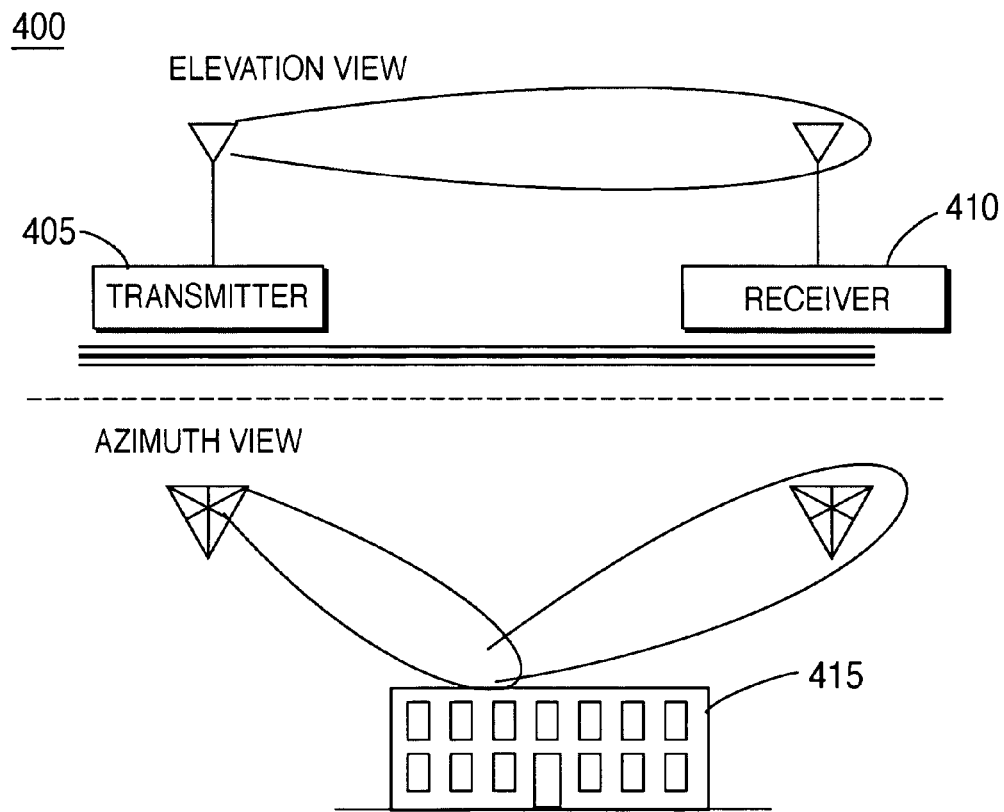
FIG. 4 illustrates multipath creation via azimuth in accordance with the present invention.

FIG. 4 illustrates a wireless communication system 400 which includes a transmitter 405 and a receiver 410. The transmitter 405 forms a multipath via an azimuth antenna pattern which reflects off an obstruction 415 to the intended receiver 410 in accordance with one embodiment of the present invention. The transmitter 405 forms the additional path by directing the beam towards an elevation obstruction.

For example, beams in one plane may be deflected, while antenna elements are used to create various beam patterns in an orthogonal plane. Scattering of the groundplane is controlled or eliminated, and beam tilt and depression is made variable. Thus, in accordance with the present invention, a beam formed by transmitter 405 may be pointed in any desired elevation angle, while the conventional transmitter provides only fixed, substantially horizon beams.

Figure 5:
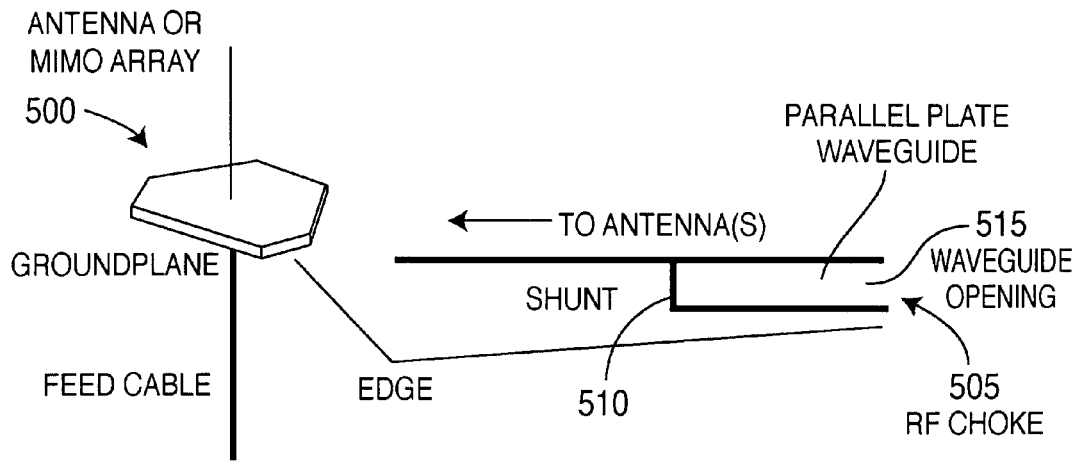
FIG. 5 illustrates an antenna, (or an antenna array), on a finite groundplane with an RF choke inserted on the edge of the groundplane in accordance with one embodiment of the present invention.

As disclosed by co-pending provisional U.S. patent application Ser. No. 60/619,763, filed on Oct. 18, 2004, an antenna or a MIMO array, situated over a finite groundplane is shown in FIG. 5, along with an enlarged cut away view of the groundplane. A continuous radio frequency (RF) choke 505 is placed on the edge, (i.e., rim), of the groundplane. The RF choke 505 is a parallel plate waveguide, which can be a printed circuit board with two conducting surfaces. The RF choke 505 may include a plurality of chokes connected in series to increase the choking effect. The RF choke 505 may be formed from any other type of transmission line or lumped element equivalent that fits the geometry of the groundplane edge. The shunt 510 shown in FIG. 5 can be formed from conducting rivets, or the equivalent. The distance between the shunt 510 and the opening 515 determines the impedance at the waveguide opening. For an infinite impedance at the opening 515, the distance between the shunt 510 and the opening 515 should be a quarter-wavelength in the propagating medium.

Figure 6:
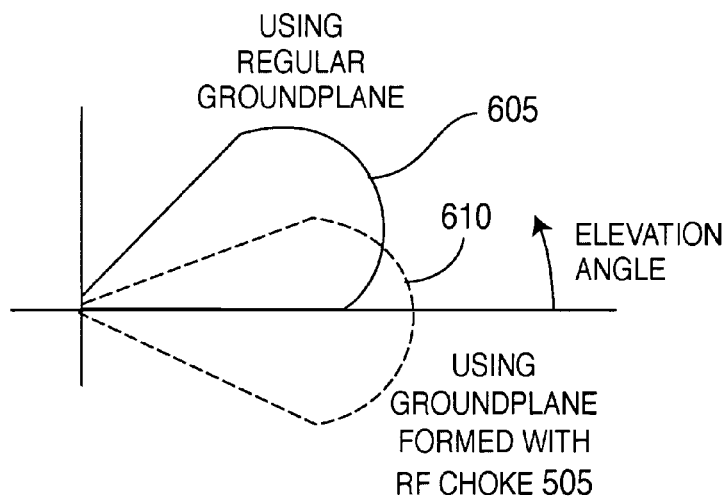
FIG. 6 illustrates a beam formed by the antenna of FIG. 6 before and after inserting the RF choke on the edge of the groundplane.

The result of using the RF choke 505 is depicted in FIG. 6, where a beam 605 is formed with a tilt using a regular groundplane, and a beam 610 formed using a groundplane with the RF choke 505 in accordance with the present invention redirects the beam toward the horizon.

In another example, a more sophisticated means to direct multiple beams with equal resolution in three dimensions may be used in accordance with the present invention. As disclosed by co-pending provisional U.S. patent application Ser. No. 60/619,223, filed on Oct. 15, 2004, using a Shelton-Butler matrix feeding a circular array creates isolated omni-directional pancake beams that are isolated from each other. The phase of each mode is characteristic of the signal's direction of arrival. By comparing the phases of two modes, information of the direction of arrival can be derived. Some mode pair selections allow unambiguous linear relationship between the phase and the angle of arrival. That greatly simplifies subsequent processing.

In elevation, amplitude comparison can be used. A complete elevation and azimuth direction finding system can thus be implemented by sharing the received single "bit" of incoming wave. A bit or pulse which contains both amplitude and phase information is shared in a manner where the amplitude information is used by elevation determination, and phase information is used for azimuth determination.

The same antenna system can electronically and automatically form a beam in the direction of the targeted incoming signal without resorting to a separate system. This system can provide enough gain for wireless applications. For a system that requires higher gain, lenses, reflectors, and electronic controlled parasitic antennas can be used to further increase directivity to meet the need of such applications.

A single array system can be used to perform direction finding and automatic beam forming in the desired direction. This system provides 360 degree instantaneous azimuth coverage, where conventional systems cannot.

Figure 7:
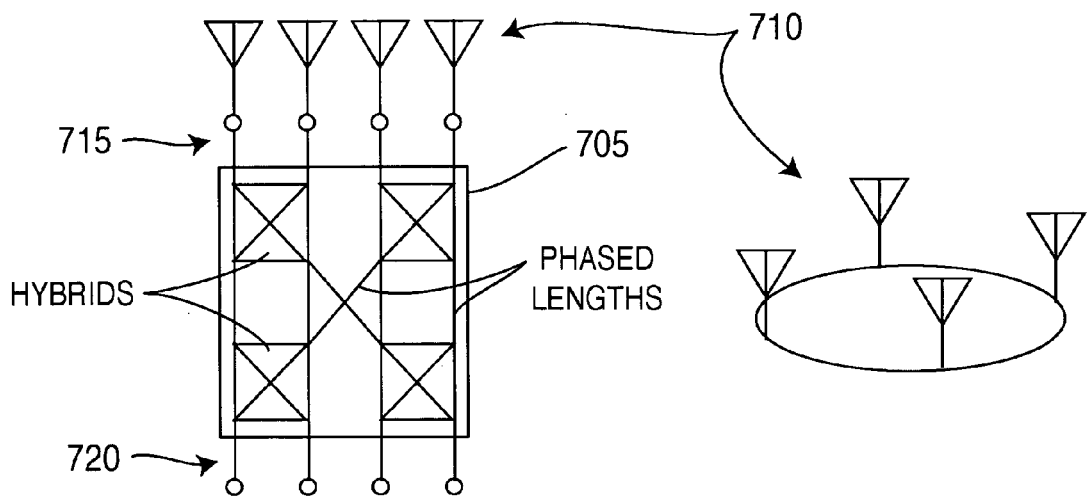
FIG. 7 shows an antenna system including a Shelton-Butler matrix feeding a circular array, thus forming a 4-port Shelton-Butler matrix fed circular array in accordance with one embodiment of the present invention.

FIG. 7 shows an antenna system 700 including a Shelton-Butler matrix 705 feeding a circular array 710, thus forming a 4-port Shelton-Butler matrix fed circular array. The ports 715 shown on top connect to the antennas of the circular array 710. The ports 720 on the bottom are mode ports. The Shelton-Butler matrix 705 includes a plurality of hybrids and fixed phase shifters which can be line-lengths. The antenna system 700 forms multiple but isolated orthogonal omni-directional pancake shaped radiation patterns. The antenna system 700 forms a plurality of available orthogonal omni-directional modes. The orthogonality preserves the full strength of each mode, which is in contrast to conventional mode formation using a power-divider, where the power is all used up in forming one mode. The phase of the antenna system 700 is linear to the angle of arrival. Linear simplicity and high precision are the products of the antenna system 700, whereby angle of arrival information is provided for both azimuth and elevation.

Elevation angle detection requires two Shelton-Butler matrices 705 which form two new modes, a sum-mode and a difference-mode. The ratio of the sum-mode over the difference-mode indicates the angle away from boresight.

In order to form a beam in the direction of the arriving signal, a phase shift is inserted in the sum-and-difference matrix to steer the sum-mode beam to the elevation boresight. This sum-mode beam can be used as the beam for communication. However, the beam shape in azimuth is still omni-directional. To form a directive beam in azimuth, all the modes in azimuth have to be aligned. This requires a power divider at the output, and phase shifters in the divided branches. The azimuth beam can be synthesized using a fast Fourier transform. The phase shifters will drive the beam to the required direction.

Figure 8:
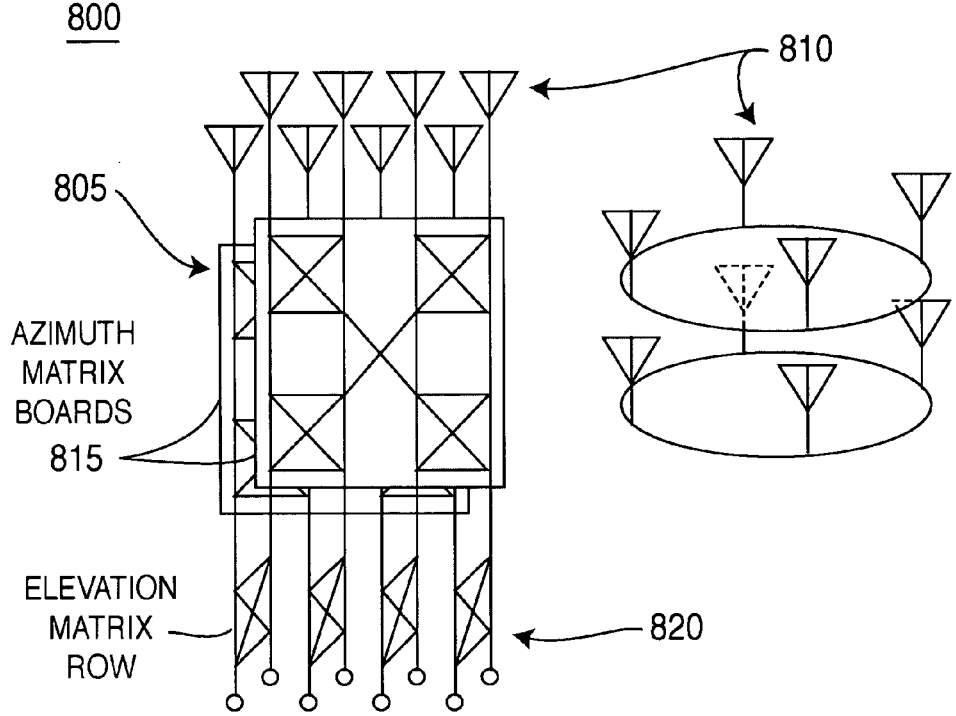
FIG. 8 shows an antenna system including a 2-tier stacked Shelton-Butler matrix feeding a stacked circular array in accordance with another embodiment of the present invention.

FIG. 8 shows an antenna system 800 including a 2-tier stacked Shelton-Butler matrix 805 feeding a stacked circular array 810. The Shelton-Butler matrix 805 includes two azimuth boards 815 feeding eight antennas of the array 810. The azimuth boards 815 are fed by a row of elevation matrices 820 that separate the family of azimuth beams into two families with different elevation angles. In this case, each elevation matrix 820 is a 2-port hybrid with proper phase delays.

Figure 9:
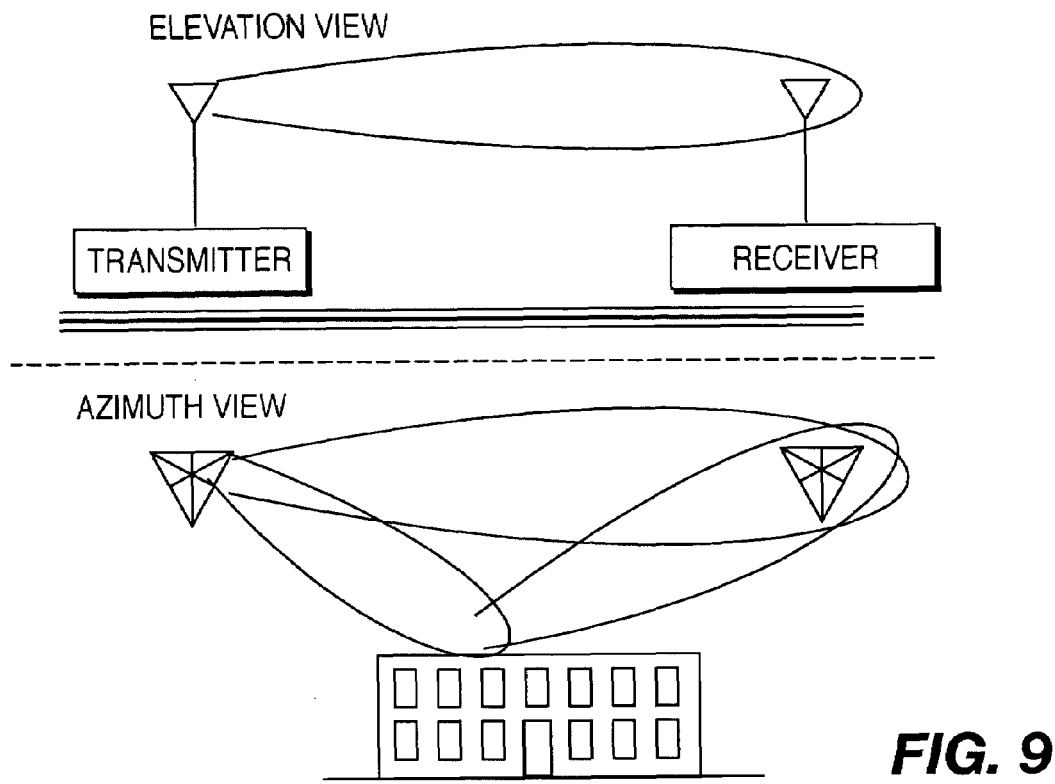
FIG. 9 illustrates line of sight and azimuth paths in accordance with the present invention.

In FIG. 9, a line of sight path and an elevation path are shown. From the elevation view both paths are parallel, while in the azimuth they are shown to be distinct.

Figure 10:
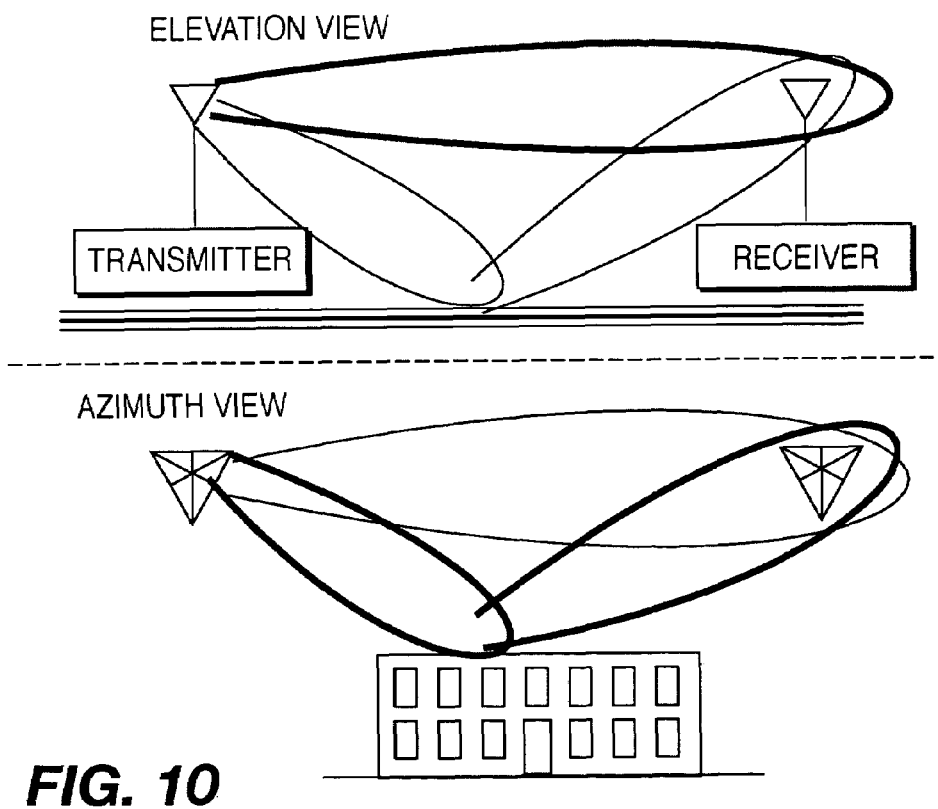
FIG. 10 illustrates azimuth and elevation usage in accordance with the present invention.

Both elevation and azimuth usage can be exploited, as illustrated in FIG. 10. The thin pattern is reflected in elevation, and the thick one in azimuth.

Figure 11:
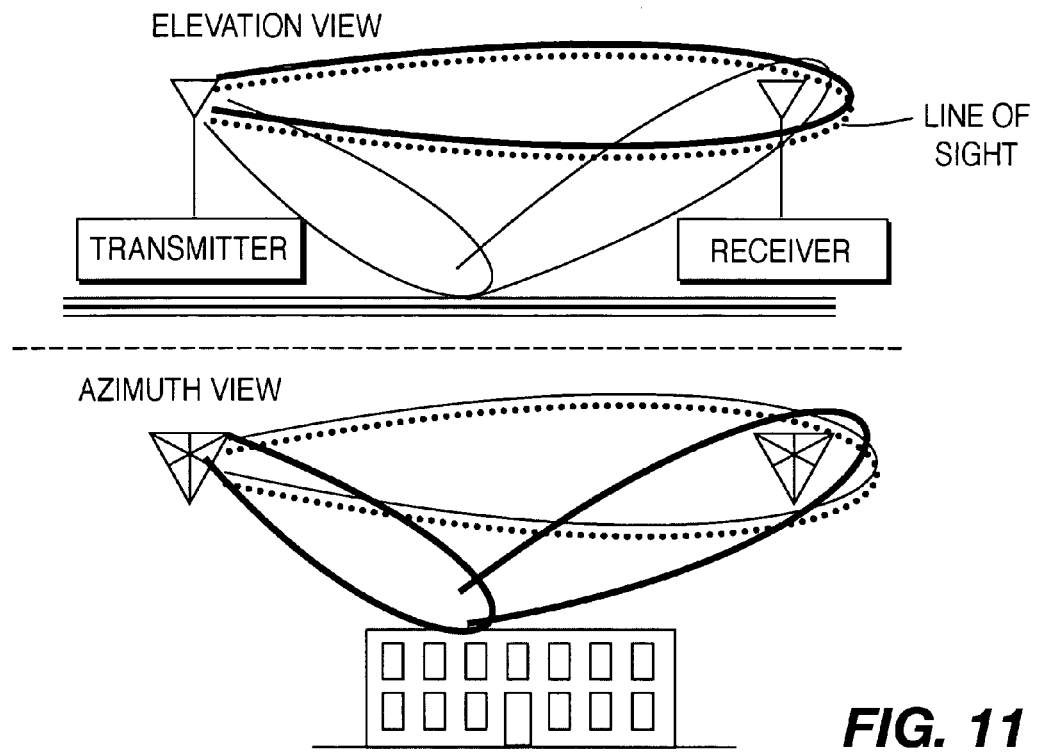
FIG. 11 illustrates line of sight, azimuth and elevation paths in accordance with the present invention.

In FIG. 11, a line of sight path, an azimuth path and an elevation path are shown, with the dotted line representing the line of sight between the antennas. The simple pattern approximations become rapidly difficult to visualize.

Figure 12:
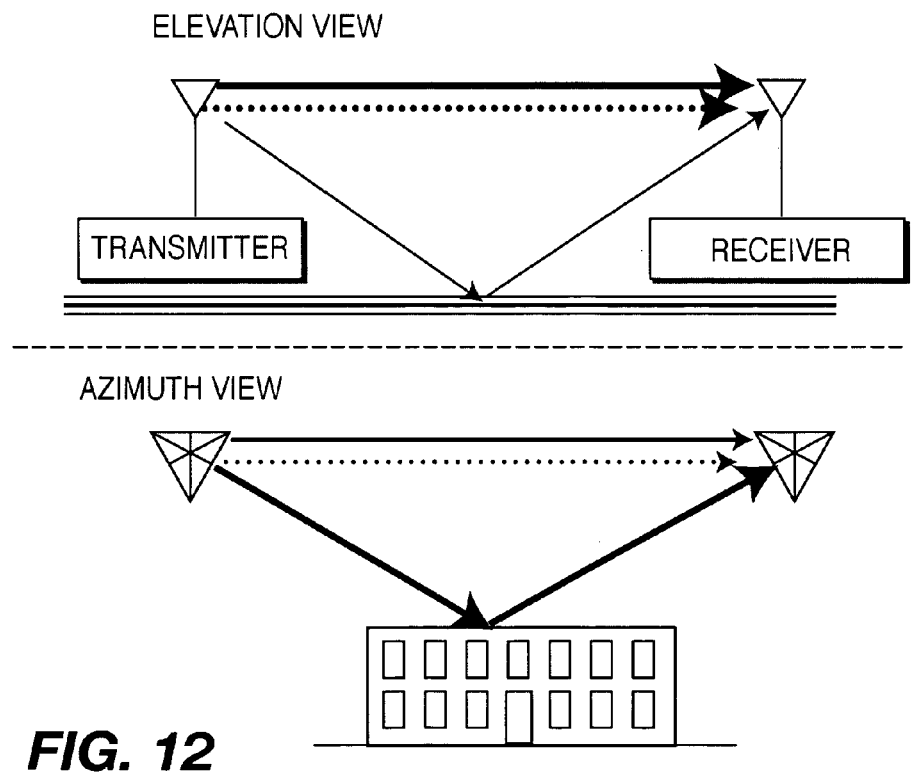
FIG. 12 illustrates line of sight, azimuth and elevation with only boresights in accordance with the present invention.
Figure 13:
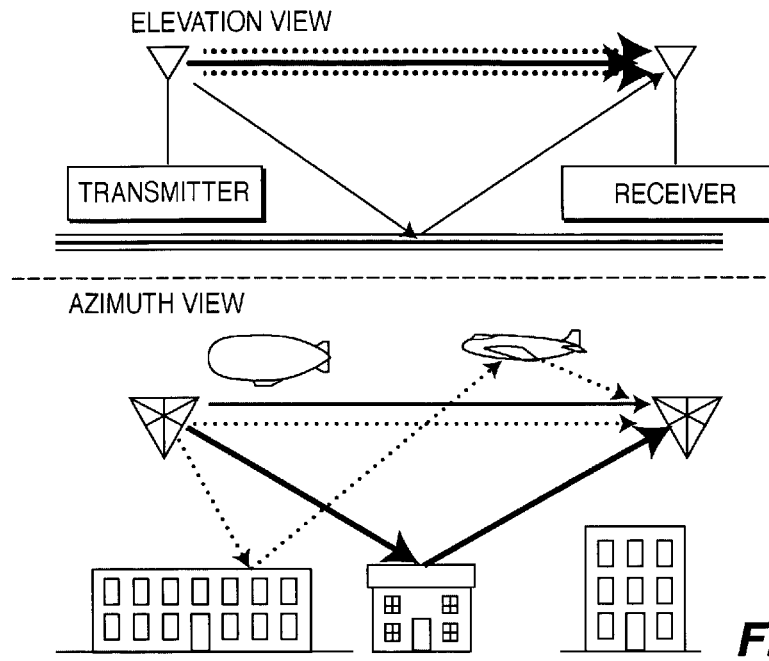
FIG. 13 illustrates azimuth opportunities in accordance with the present invention.
Figure 14:
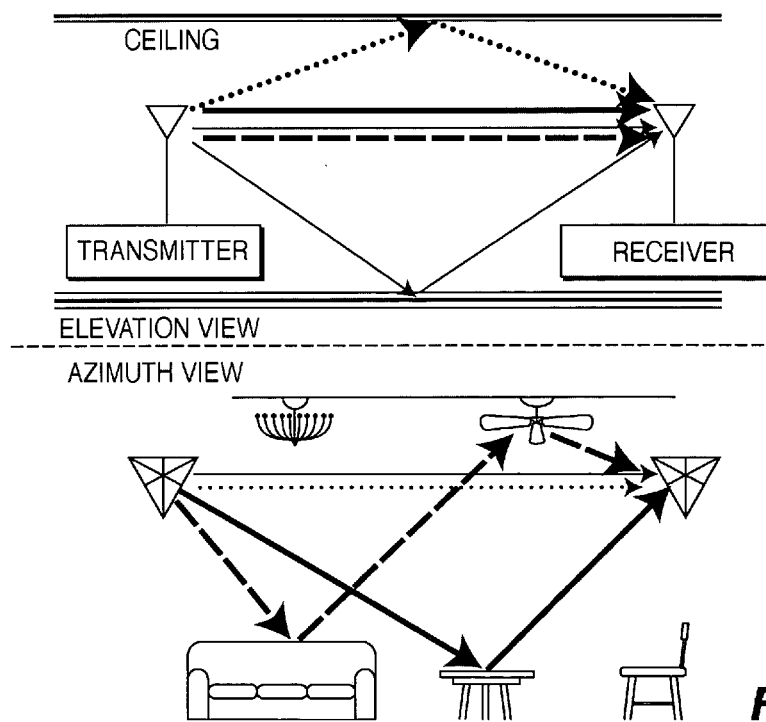
FIG. 14 illustrates general elevation opportunities in accordance with the present invention.

As shown in FIGS. 12-14, the simple pattern approximations are replaced by arrows showing just the boresight of the beams.

FIG. 12 illustrates line of sight, azimuth, and elevation with only boresights. In actual deployments, there may be obstructions to both sides of the line of sight, and irregularities in their placement and form that allow for many more beams, as shown in FIG. 13.

As shown in FIG. 14, deployments inside of buildings also provide for more opportunities, as the ceilings or objects fastened thereto become another obstacle.

While FIGS. 1-14 have been illustrated from the transmitter's viewpoint of creating multipaths, consideration also needs to be given to the receiver's operation. One means to differentiate the received paths is by multi-user detection (MUD) methods. The basic concept is that if a data stream can be properly decoded, its modulation pattern can be reconstructed, and subtracted from the summed reception of all the signals. This process is repeated until all possible individual data streams are decoded. Alternatively, receiver beams may be pointed at a plurality of individual reception paths, whereby the receiver decodes each path individually.

A very robust methodology is to combine both the MUD and receiver beamforming methods. The beamforming basically reduces the number of paths being seen by the decoder at any one time, and the MUD separates any multiple path receptions that still exist. There are also opportunities for a MUD and/or beam operational instance to accurately decode one or more paths, and for the resultant information to be utilized by the MUD in another beam instance to enhance its operation.

Figure 15:
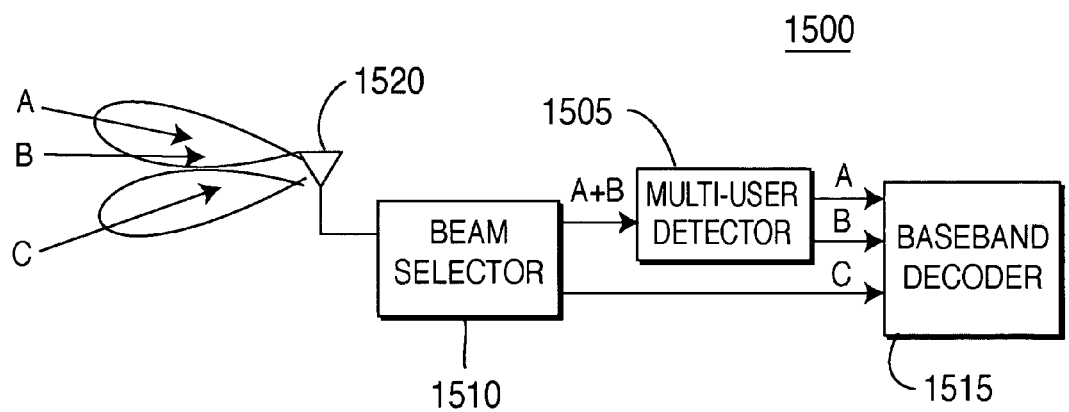
FIG. 15 is a block diagram of an exemplary receiver configured according to a preferred embodiment of the present invention.
Figure 3:
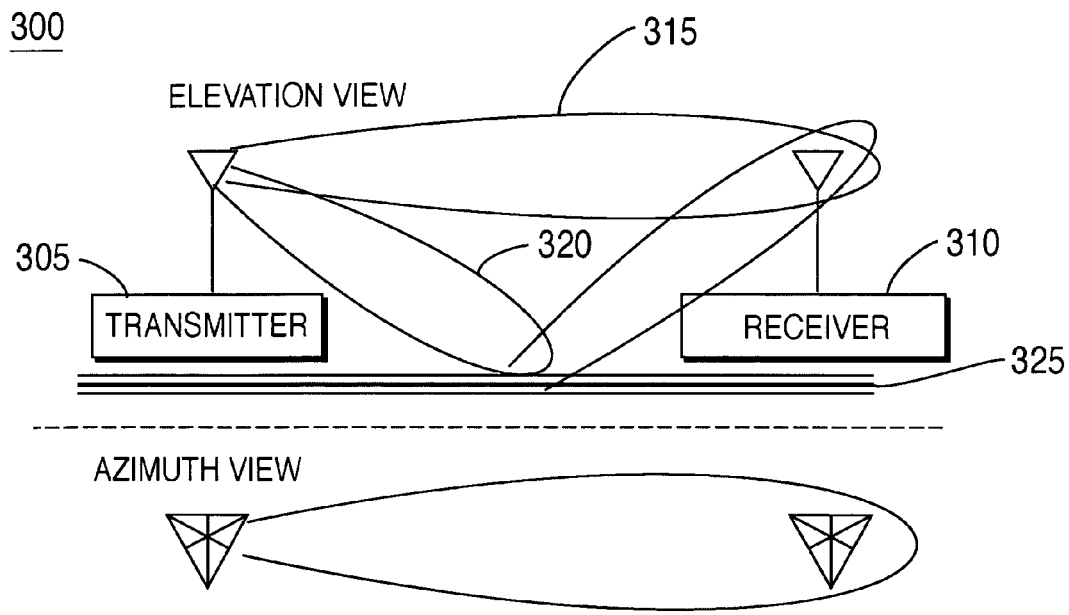
FIG. 3 illustrates multipath creation via elevation as implemented by conventional wireless communication systems.

FIG. 15 is a block diagram of an exemplary receiver 1500 configured according to a preferred embodiment of the present invention. The receiver 1500 includes a multi-user detector 1505, a beam selector 1510, a baseband decoder 1515 and an antenna 1520. A group of signals A, B and C received by the antenna 1520 are forwarded to the beam selector 1510 which separates the signal C from the group of signals A, B and C. The signal C is sent from the beam selector 1510 directly to the baseband decoder 1515. The signals A and B are sent from the beam selector 1510 to the multi-user detector 1505.

One of ordinary skill in the art would realize that any actual utilization of the present invention is subject to real world constraints. For example, irregularities in obstacles, the movement of the obstacles themselves, (e.g., cars, window, people), weather condition changes, or the like, may change the multipath environment.

The initial determination of the usable beam patterns may be partially or in whole derived using the different embodiments described below.

In one embodiment, a user of communication services observes existing opportunities for paths from both the receiver and transmitter perspectives is used to derive settings, which are then entered, (e.g., stored in a memory), using either the manual directional controls of hardware equipment, (e.g., a keyboard), or by some sighting methodology, (e.g., adjusting a signal to create a path and pressing a button to lock in the coordinates when it is adequately detected). For example, the observations could be that there are buildings to the left of the main communication direction, but an open area to the right. The present invention would interpret this as meaning that reflection paths are possible to the left, while it would be a waste of resources, (e.g., beam power), to direct any beams to the right.

In another embodiment, an omni-directional or broad beam is sent in the general direction of the receiver. The receiver has the capability to discern the direction from which it receives adequate signals. This information is returned to the transmitter, which narrows its beam transmission in a particular sequence to eliminate some multipaths. The receiver notes the significant changes in the received signals, and returns the information to the sender. This ongoing interactive process determines the general characteristics of the multipaths available.

In yet another embodiment, the transmitter scans narrow beams, (i.e. azimuth, elevation, or both), and receives indications from the receiver as to the reception it detects at various times in the scan. The scanning process reveals to the sender and receiver which paths are useable.

Since paths may come and go, ongoing communication is best served by coding redundancy and path redundancy. The degree to which these overhead burdens degrade the effective data rate will be very situational dependant. The potential gain obtainable by the present invention, however, will in most cases greatly overshadow the lost from the ideal knowledge of the paths situation.

While the present invention has been described in terms of the preferred embodiment, other variations which are within the scope of the invention as outlined in the claims below will be apparent to those skilled in the art.

What is claimed is:

1. A wireless communication apparatus comprising:
   a transmitter; and
   a beam forming antenna with multiple beam forming elements for transmitting multiple beams over a plurality of beam paths, wherein the beams include a bit or pulse which contains both amplitude information used to determine elevation and phase information used to determine azimuth, and the transmitter narrows the beams in a particular sequence to eliminate some of the beam paths based on feed back information.

2. The apparatus of claim 1 wherein beams in one plane are deflected.

3. The apparatus of claim 1 wherein the beam forming antenna is used to create various beam patterns in an orthogonal plane.

4. The apparatus of claim 1 wherein the tilt and depression of beams formed by the beam forming antenna are variable.

5. The apparatus of claim 1 wherein the beams can be pointed at any desired elevation angle.

6. The apparatus of claim 1 wherein the transmitter is further configured to receive feed back information regarding the direction fron which usable beam paths are received.

7. A wireless communication apparatus comprising:
a transmitter; and
a beam forming antenna with multiple beam forming elements for transmitting multiple beams over a plurality of beam paths, wherein the beams include a bit or pulse which contains both amplitude information used to determine elevation and phase information used to determine azimuth, and the transmitter initiates a narrow beam scanning process in at least one of azimuth and elevation, and receives feed back information at various times.

8. The apparatus of claim 7 wherein beams in one plane are deflected.

9. The apparatus of claim 7 wherein the beam forming antenna is used to create various beam patterns in an orthogonal plane.

10. The apparatus of claim 7 wherein the tilt and depression of beams formed by the beam forming antenna are variable.

11. The apparatus of claim 7 wherein the beams can be pointed at any desired elevation angle.

12. The apparatus of claim 7 wherein the transmitter is further configured to receive feed back information regarding the direction from which usable beam paths are received.

* * * * *

UNITED STATES PATENT AND TRADEMARK OFFICE
CERTIFICATE OF CORRECTION

PATENT NO.        : 7,551,680 B2                                                Page 1 of 1
APPLICATION NO.   : 11/014290
DATED             : June 23, 2009
INVENTOR(S)       : Steven Jeffrey Goldberg It is certified that error appears in the above-identified patent and that said Letters Patent is hereby corrected as shown below:

IN THE SPECIFICATION

At column 6, line 41, after the words "overshadow the" delete "lost" and insert therefor --loss--.

At column 6, line 42, after the words "edge of the" delete "paths" and insert therefor --path's--.

IN THE CLAIMS

At claim 1, column 6, line 58, before the word "information" delete "feed back" and insert therefor --feedback--.

At claim 6, column 7, line 2, before the word "information" delete "feed back" and insert therefor --feedback--.

At claim 7, column 7, line 13, before the word "information" delete "feed back" and insert therefor --feedback--.

At claim 12, column 8, line 11, before the word "information" delete "feed back" and insert therefor --feedback--.

Signed and Sealed this

Twentieth Day of October, 2009

David J. Kappos
*Director of the United States Patent and Trademark Office*